(12) United States Patent
Komiyama et al.

(10) Patent No.: US 12,025,073 B2
(45) Date of Patent: Jul. 2, 2024

(54) INTERNAL COMBUSTION ENGINE

(71) Applicant: ISUZU MOTORS LIMITED, Tokyo (JP)

(72) Inventors: Takumi Komiyama, Fujisawa (JP); Kazunari Yamamoto, Fujisawa (JP); Misao Goto, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 18/118,617

(22) Filed: Mar. 7, 2023

(65) Prior Publication Data

US 2023/0323833 A1 Oct. 12, 2023

(30) Foreign Application Priority Data

Mar. 24, 2022 (JP) .................. 2022-047840

(51) Int. Cl.
*F02F 1/24* (2006.01)
*F02F 1/00* (2006.01)

(52) U.S. Cl.
CPC .......... *F02F 1/24* (2013.01); *F02F 2001/006* (2013.01); *F05D 2260/221* (2013.01); *F05D 2300/10* (2013.01)

(58) Field of Classification Search
CPC . F02F 1/24; F02F 2001/006; F05D 2260/221; F05D 2300/10
USPC ........................................... 123/193.1, 193.6
See application file for complete search history.

(56) References Cited

U.S. PATENT DOCUMENTS

| | | | | |
|---|---|---|---|---|
| 2,939,753 | A | * | 6/1960 | Schilling ................ F02F 11/002 220/378 |
| 4,513,703 | A | | 4/1985 | Eckert |
| 4,774,917 | A | * | 10/1988 | Tokoro ...................... F16J 9/02 123/669 |
| 5,154,433 | A | * | 10/1992 | Naruse ...................... F16J 9/26 277/443 |
| 6,036,194 | A | * | 3/2000 | Stamper ............... F16J 15/0881 277/593 |
| 6,367,463 | B1 | | 4/2002 | Nurmi |
| 6,367,848 | B1 | * | 4/2002 | Bruce ...................... F02F 1/16 123/193.2 |
| 2007/0107689 | A1 | * | 5/2007 | Oogake ................... F02F 1/16 123/193.2 |

(Continued)

FOREIGN PATENT DOCUMENTS

CN 211819644 U 10/2020
DE 3236185 A1 4/1984
(Continued)

*Primary Examiner* — Sizo B Vilakazi
(74) *Attorney, Agent, or Firm* — PROCOPIO, CORY, HARGREAVES & SAVITCH LLP

(57) ABSTRACT

An internal combustion engine includes: a cylinder in which a piston reciprocates; a stepped portion that is formed on an upper end portion of an inner peripheral surface of the cylinder; and a ring member having a cylindrical shape provided to the stepped portion. The thickness of the ring member decreases toward the bottom dear center of the piston, and an outer peripheral surface of the ring member is an inclined surface, where a lower end of the outer peripheral surface is positioned closer to the center in the radial direction of the ring member than an upper end of the outer peripheral surface.

9 Claims, 3 Drawing Sheets

(56) References Cited

U.S. PATENT DOCUMENTS

| | | | | |
|---|---|---|---|---|
| 2013/0068188 A1* | 3/2013 | Liander | ................... | F02F 11/00 |
| | | | | 123/193.3 |
| 2018/0266359 A1* | 9/2018 | Beasley | ................... | F02F 1/18 |
| 2023/0026354 A1* | 1/2023 | Terakado | ................ | F02F 1/004 |

FOREIGN PATENT DOCUMENTS

| | | | |
|---|---|---|---|
| JP | S55-112023 U | | 8/1980 |
| JP | S56-011345 U | | 1/1981 |
| JP | H11-294255 A | | 10/1999 |
| JP | 2013-530340 A | | 7/2013 |
| JP | 2016075270 A | * | 5/2016 |
| JP | 2017-089410 A | | 5/2017 |
| JP | 2017-089411 A | | 5/2017 |

* cited by examiner

INTERNAL COMBUSTION ENGINE

CROSS-REFERENCE TO RELATED APPLICATIONS

The present application claims priority to Japanese Patent Application number 2022-047840, filed on Mar. 24, 2022 contents of which are incorporated herein by reference in their entirety.

BACKGROUND OF THE INVENTION

The present disclosure relates to an internal combustion engine including a cylinder and a piston.

In an internal combustion engine, a ring member is provided to a stepped portion formed on an upper portion of an inner peripheral surface of a cylinder. For example, Japanese Unexamined Patent Application Publication No. 2017-089410 discloses an internal combustion engine in which a scraper ring is provided to a stepped portion in order to remove soot adhered to a piston.

In an internal combustion engine, it is desirable to reduce heat loss. However, when the ring member is disposed at an upper portion of the cylinder, it is difficult to maintain the inside of a combustion chamber at a high temperature due to heat loss by the ring member.

BRIEF SUMMARY OF THE INVENTION

The present disclosure has been made in view of these points, and its object is to provide an internal combustion engine capable of reducing heat loss even though a ring member is provided.

In an aspect of the present disclosure, there is provided an internal combustion engine including: a cylinder in which a piston reciprocates; a stepped portion formed at an upper end portion of an inner peripheral surface of the cylinder; and a ring member having a cylindrical shape provided to the stepped portion, wherein a thickness of the ring member decreases toward a bottom dead center of the piston, and an outer peripheral surface of the ring member is an inclined surface, where a lower end of the outer peripheral surface is positioned closer to the center in a radial direction of the ring member than an upper end of the outer peripheral surface.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

<Configuration of the International Combustion Engine>

A configuration of an internal combustion engine according to an embodiment will be described with reference to FIG. 1.

Figure 1:
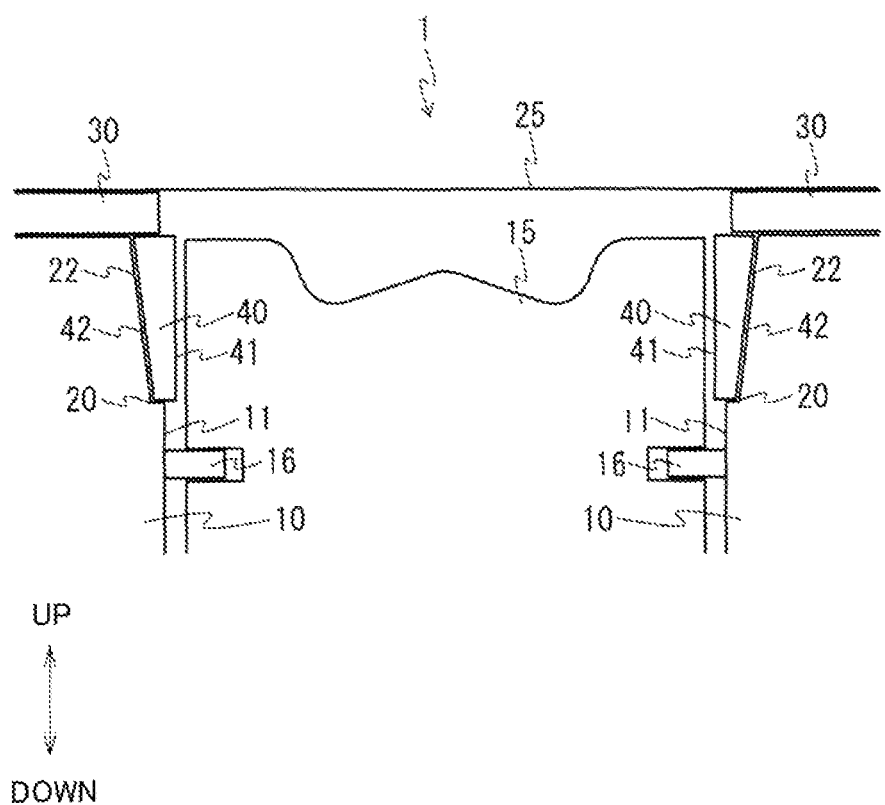
FIG. 1 is a schematic view illustrating an internal configuration of an internal combustion engine 1 according to an embodiment.

FIG. 1 is a schematic view illustrating an internal configuration of an internal combustion engine 1 according to an embodiment. In FIG. 1, only a portion of the internal combustion engine 1 is shown, and other components are omitted for convenience of explanation.

The internal combustion engine 1 is, for example, an engine mounted on a vehicle. As shown in FIG. 1, the internal combustion engine 1 includes a cylinder 10, a piston 15, a stepped portion 20, a cylinder head 25, a gasket 30, and a ring member 40.

The cylinder 10 is made of metal and formed in a cylindrical shape. The piston 15 is housed in the cylinder 10.

The piston 15 reciprocates between the top dead center and the bottom dead center in the cylinder 10. In FIG. 1, the piston 15 is positioned at the top dead center. A piston ring 16 is fitted into a groove formed on the outer peripheral surface of the piston 15.

As shown in FIG. 1, the stepped portion 20 is positioned at an upper end portion of the inner peripheral surface 11 of the cylinder 10. The stepped portion 20 is positioned above the piston ring 16 when the piston 15 is positioned at the top dead center. The stepped portion 20 is formed such that the stepped portion 20 extends circumferentially inside the inner peripheral surface 11 of the cylinder 10. The stepped portion 20 is positioned below the gasket 30.

The stepped portion 20 has the inner peripheral surface 22, which is an inclined surface as shown in FIG. 1. Here, the inner peripheral surface 22 is linearly inclined at a predetermined inclination angle. The inner peripheral surface 22 is inclined such that the inner peripheral surface 22 becomes closer to the center of the cylinder 10 towards the bottom surface of the inner peripheral surface 22.

The cylinder head 25 is positioned above the cylinder 10. The cylinder head 25 is made of metal, and is made of the same material as the cylinder 10, for example. The gasket 30 is disposed between the cylinder 10 and the cylinder head 25. The gasket 30 has a function of enhancing airtightness in the cylinder 10.

As shown in FIG. 1, the ring member 40 is provided to the stepped portion 20. Specifically, the ring member 40 is fitted into the stepped portion 20. The ring member 40 is formed in a cylindrical shape and covers the circumference of the piston 15 positioned at the top dead center. The ring member 40 is made of metal. Here, the ring member 40 is made of the same material as the cylinder 10, but is not limited thereto, and may be made of a different material than the cylinder 10.

The ring member 40 is provided to narrow the space between the cylinder 10 and the piston 15. That is, the inner peripheral surface 41 of the ring member 40 is positioned closer to the outer peripheral surface of the piston 15 than the inner peripheral surface 11 of the cylinder 10. If the ring member 40 is not provided, the space between the inner peripheral surface 11 of the cylinder 10 and the outer peripheral surface of the piston 15 ends up being a useless space, which is not used for combustion, thereby reducing combustion efficiency. On the other hand, if the ring member 40 is provided as in the present embodiment, it is possible to narrow the useless space, and thus the compression ratio is increased and fuel efficiency is improved.

The inner peripheral surface 41 of the ring member 40 is parallel to the inner peripheral surface 11 of the cylinder 10, but the outer peripheral surface 42 of the ring member 40 is not parallel to the inner peripheral surface 11 of the cylinder 10. The outer peripheral surface 42 of the ring member 40 is an inclined surface, where a lower end of the outer peripheral surface 42 is positioned closer to the center in the radial direction of the ring member 40 than an upper end of the outer peripheral surface 42. The inclination angle of the outer peripheral surface 42 is the same as the inclination angle of the inner peripheral surface 22 of the stepped portion 20, and the outer peripheral surface 42 is parallel to the inner peripheral surface 22.

As shown in FIG. 1, the thickness of the ring member 40 decreases toward the bottom surface of the stepped portion 20. In other words, the thickness of the ring member 40 decreases toward the bottom dead center of the piston 15. Here, the thickness of a lower end of the ring member 40 is equal to or less than half the thickness of an upper end of the ring member 40. Providing the ring member 40 having such thickness has benefits compared to the comparative example shown in FIG. 2.

Figure 2:
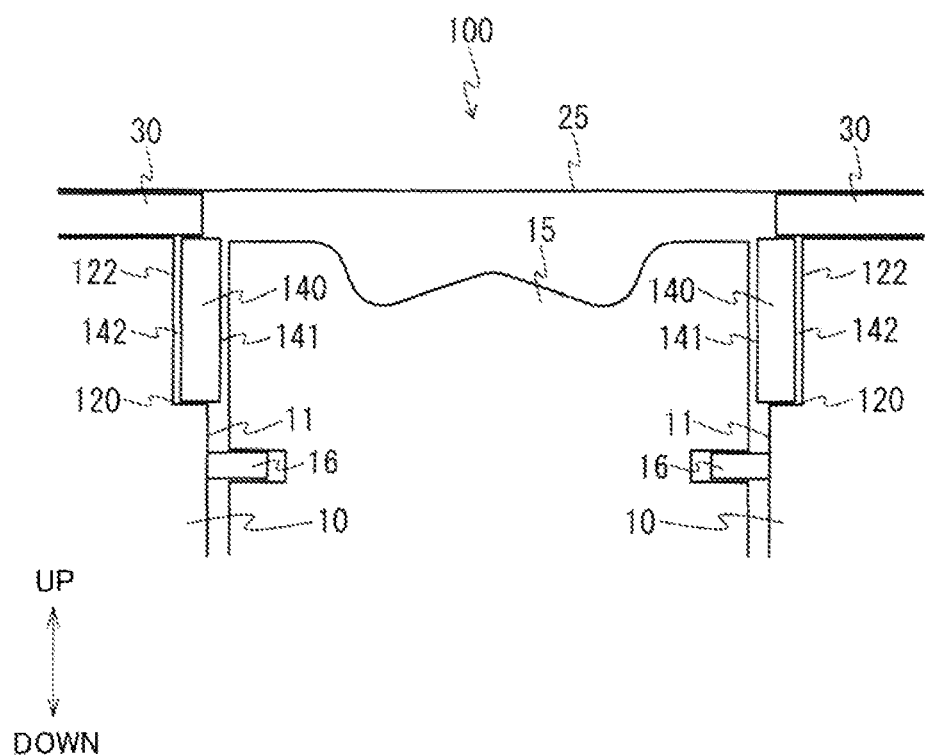
FIG. 2 is a schematic view illustrating an internal combustion engine 100 according to a comparative example.

FIG. 2 is a schematic view illustrating an internal combustion engine 100 according to the comparative example. In the comparative example, the inner peripheral surface 141 and the outer peripheral surface 142 of a ring member 140 are parallel to each other, and the thickness of the ring member 140 is constant. Further, the inner peripheral surface 122 of a stepped portion 120 is parallel to the inner peripheral surface 11 of the cylinder 10. In a case where the ring member 140 is provided, a certain amount of heat is lost by the ring member 140 as compared with a case where the ring member is not provided. Therefore, it is difficult to maintain the inside of the cylinder 10 at a high temperature.

In contrast, in the present embodiment, the outer peripheral surface 42 of the ring member 40 is an inclined surface. Due to this, the thickness of the ring member 40 is not constant, meaning that the thickness of the ring member 40 decreases toward the bottom surface of the stepped portion 20. In particular, the thickness of the lower end of the ring member 40 is equal to or less than half the thickness of the upper end of the ring member 40. In this case, since the volume of the ring member 40 is smaller than that of the ring member 140 of the comparative example, the heat capacity of the ring member 40 is smaller. This allows the temperature of the ring member 40 to rise easily, and a heat shielding effect is enhanced while reducing heat loss.

Further, in a case where the outer peripheral surface 42 is an inclined surface, the area of the outer peripheral surface 42 is larger than the area of the outer peripheral surface 142 of the comparative example. That is, since the area of the outer peripheral surface 42 facing the inner peripheral surface 22 of the stepped portion 20 is large, gas leakage can be prevented. Further, since the outer peripheral surface 42 and the inner peripheral surface 22 of the stepped portion 20 are inclined surfaces, the ring member 40 can be easily fitted into the stepped portion 20.

The inner peripheral surface 41 of the ring member 40 is a mirror surface, and the irregularities on the inner peripheral surface 41 are extremely small. For example, the arithmetic average roughness indicating the surface roughness of the inner peripheral surface 41 is 0.1 μm or less. Since the inner peripheral surface 41 is a mirror surface, it is possible to prevent the adhesion of soot to the inner peripheral surface 41. This helps to reduce heat loss caused by soot absorbing heat, so that it is possible to enhance a heat shielding effect in the cylinder 10. Conversely, if the inner peripheral surface is not a mirror surface, soot can easily adhere to the irregularities on the inner peripheral surface.

Modified Example

Figure 3:
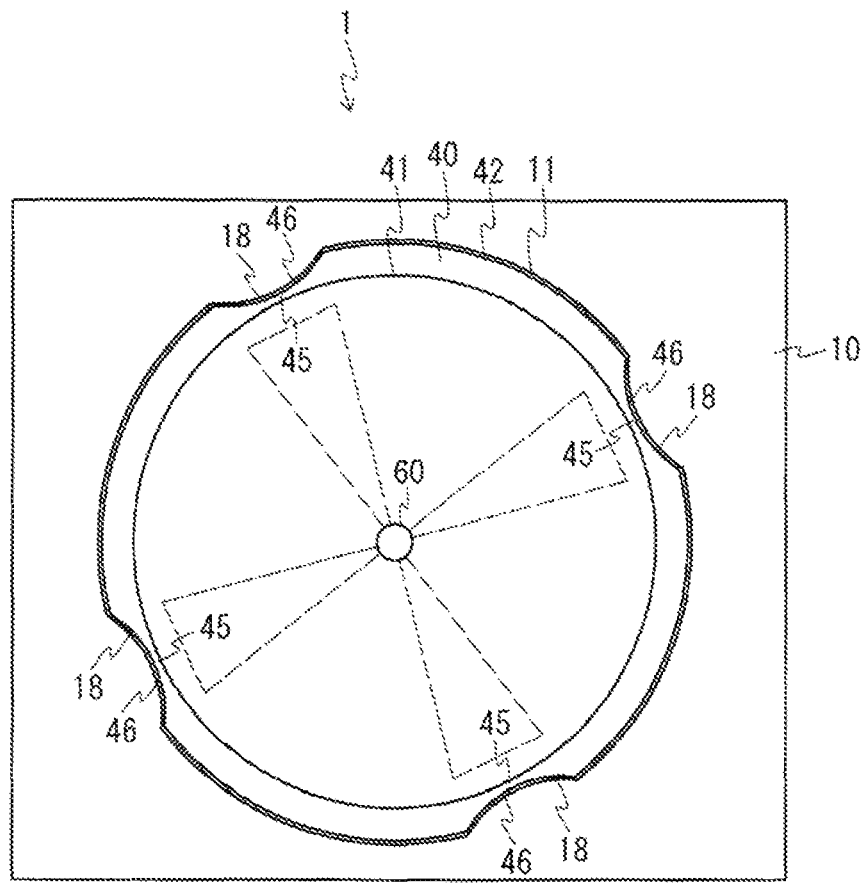
FIG. 3 is a schematic view illustrating a modified example of the internal combustion engine 1.

FIG. 3 is a schematic view illustrating a modified example of the internal combustion engine 1. In FIG. 3, the piston 15 and the like are omitted for convenience of explanation.

The configurations of the ring member 40 and the inner peripheral surface 11 of the cylinder 10 of the modified example are different from the configurations of the ring member 40 and the inner peripheral surface 11 shown in FIG. 1. Since configurations of other components of the modified example are the same as the configurations shown in FIG. 1, detailed description thereof will be omitted.

The internal combustion engine 1 includes an injector 60 that injects fuel. The injector 60 is positioned above the central axis of the cylinder 10, and injects fuel in a radial direction inside the cylinder 10, for example. A direction in which the fuel injected from the injector 60 flows is indicated by a region drawn by a broken line in FIG. 3.

The width of the ring member 40 of the modified example is not constant. Specifically, as shown in FIG. 3, in the ring member 40, the thicknesses of a plurality of injection destination portions 45, which are portions where the fuel in the injector 60 is to be injected, are smaller than the thicknesses of the other portions. The injection destination portions 45 are provided at four positions at predetermined intervals in the circumferential direction of the ring member 40. The thicknesses of portions other than the injection destination sections 45 are constant.

A concave portion 46 is formed on the outer peripheral surface 42 of the ring member 40. Here, the concave portion 46 is a curved recess. The concave portions 46 are formed at four positions at predetermined intervals on the outer peripheral surface 42. The injection destination portion 45 is a portion where the concave portion 46 is formed on the outer peripheral surface 42 of the ring member 40. As shown in FIG. 3, the smallest thickness in the concave portion 46 is smaller than half the thickness of the other portion of the ring member 40.

It should be noted that although the concave portion 46 is formed on the outer peripheral surface 42 of the ring member 40 in the above description, the present disclosure is not limited thereto, and the concave portion may be formed on the inner peripheral surface 41 of the ring member 40, for example.

By reducing the thickness of the injection destination portion 45 of the ring member 40 as described above, the volume of the ring member 40 is further reduced, and the heat capacity of the ring member 40 is further reduced. This allows the temperature of the ring member 40 to rise more easily, and a heat shielding effect is even more enhanced.

A plurality of convex portions 18 that fit respective concave portions 46 of each injection destination portion 45 are formed on the inner peripheral surface 11 of the cylinder 10. The convex portions 18 are provided at four positions at predetermined intervals in the circumferential direction. Here, each convex portion 18 has a curved convex shape. The convex portion 18 is fitted into the concave portion 46 of the ring member 40. Accordingly, when the ring member 40 is fitted into the stepped portion 20 of the cylinder 10, the injection destination portion 45 can be positioned at an appropriate position. Further, even if the ring member 40 attempts to rotate in the circumferential direction during the operation of the internal combustion engine 1, the concave portion 46 and the convex portion 18 fitting with each other function as a rotation stopper, for example.

Effects of the Present Embodiment

The internal combustion engine 1 of the above-described embodiment includes the ring member 40 having a cylindrical shape, which is provided to the stepped portion 20 formed on an upper end portion of the inner peripheral surface 11 of the cylinder 10. The thickness of the ring member 40 decreases toward the bottom dead center of the piston 15, and the outer peripheral surface 42 of the ring member 40 is an inclined surface, where the lower end of the outer peripheral surface 42 is positioned closer to the center in the radial direction of the ring member 40 than the upper end of the outer peripheral surface 42.

In a case where the ring member 40 whose outer peripheral surface 42 is an inclined surface is provided, the volume of the ring member 40 is reduced. Thus, the heat capacity of the ring member 40 is reduced. As a result, the temperature of the ring member 40 is likely to rise, and a heat shielding effect is enhanced while reducing heat loss.

The present disclosure has been described above on the basis of the exemplary embodiments. The technical scope of the present disclosure is not limited to the scope explained in the above embodiments, and it is obvious to those skilled in the art that various changes and modifications within the scope of the invention may be made. An aspect to which such changes and modifications are added can be included in the technical scope of the present invention is obvious from the description of the claims.

What is claimed is:

1. An internal combustion engine comprising:
   a cylinder in which a piston reciprocates;
   a stepped portion formed at an upper end portion of an inner peripheral surface of the cylinder;
   a ring member having a cylindrical shape provided to the stepped portion; and
   an injector that injects fuel,
   wherein a thickness of the ring member decreases toward a bottom dead center of the piston,
   wherein an outer peripheral surface of the ring member is an inclined surface, where a lower end of the outer peripheral surface is positioned closer to the center in a radial direction of the ring member than an upper end of the outer peripheral surface, and
   wherein, in a circumferential direction of the ring member, thicknesses of a plurality of injection destination portions, which are portions where the fuel in the injector is to be injected, are smaller than thicknesses of other portions.

2. The internal combustion engine according to claim 1, wherein
   an inner peripheral surface of the stepped portion is an inclined surface parallel to the outer peripheral surface, which is an inclined surface of the ring member.

3. The internal combustion engine according to claim 1, wherein
   a thickness of the lower end of the ring member is equal to or less than half a thickness of the upper end of the ring member.

4. The internal combustion engine according to claim 1, wherein
   an inner peripheral surface of the ring member is a mirror surface.

5. The internal combustion engine according to claim 1, wherein the injection destination portion is a portion where a concave portion is formed on an outer peripheral surface of the ring member.

6. The internal combustion engine according to claim 5, wherein
   a plurality of convex portions that fit the respective concave portions of each injection destination portion are formed on the inner peripheral surface of the cylinder.

7. The internal combustion engine according to claim 6, wherein
   the concave portion is a curved recess, and
   the convex portion has a curved convex shape.

8. The internal combustion engine according to claim 5, wherein a smallest thickness in the concave portion is smaller than half a thickness of the other portion of the ring member.

9. The internal combustion engine according to claim 1, wherein the injection destination portion is a portion where a concave portion is formed on an inner peripheral surface of the ring member.

* * * * *